United States Patent [19]
Miczek

[11] 3,722,185
[45] Mar. 27, 1973

[54] GAS SCRUBBING METHOD AND APPARATUS

[75] Inventor: Gerhard Miczek, Louisville, Ky.

[73] Assignee: Fisher Klosterman, Inc., Louisville, Ky.

[22] Filed: June 9, 1971

[21] Appl. No.: 151,213

[52] U.S. Cl..............55/238, 55/241, 261/79 A, 261/109, 261/112
[51] Int. Cl. ...................................B01d 47/06
[58] Field of Search........55/237, 238, 241; 261/79 A, 261/109, 112

[56] References Cited

UNITED STATES PATENTS

| | | | |
|---|---|---|---|
| 793,110 | 6/1905 | Uehling | 55/238 |
| 1,461,174 | 7/1923 | Bennett | 55/237 |
| 2,551,890 | 5/1951 | Love | 55/237 |

Primary Examiner—Tim R. Miles
Assistant Examiner—Steven H. Markowitz
Attorney—George C. Atwell

[57] ABSTRACT

Apparatus is provided for utilizing a liquid flow to remove particulate solids such as dust from industrial gases. The apparatus includes a contacting chamber having means therewith for providing a continuous water wash-down in the form of a substantially downward water sheet concentric to the chamber inner surface. Provision is made for dust-laden gas to enter the chamber tangentially and thereafter flow upwardly in a helical path whereby dust particles are centrifugally driven into the concentric water sheet. A means is provided inwardly adjacent the tangential inlet to substantially increase the efficiency of dust removal from the flowing gas. The latter means makes possible the attainment of performance, in a medium energy gas scrubbing apparatus, favorably comparable to a high energy and relatively expensive venturi scrubber apparatus.

16 Claims, 6 Drawing Figures

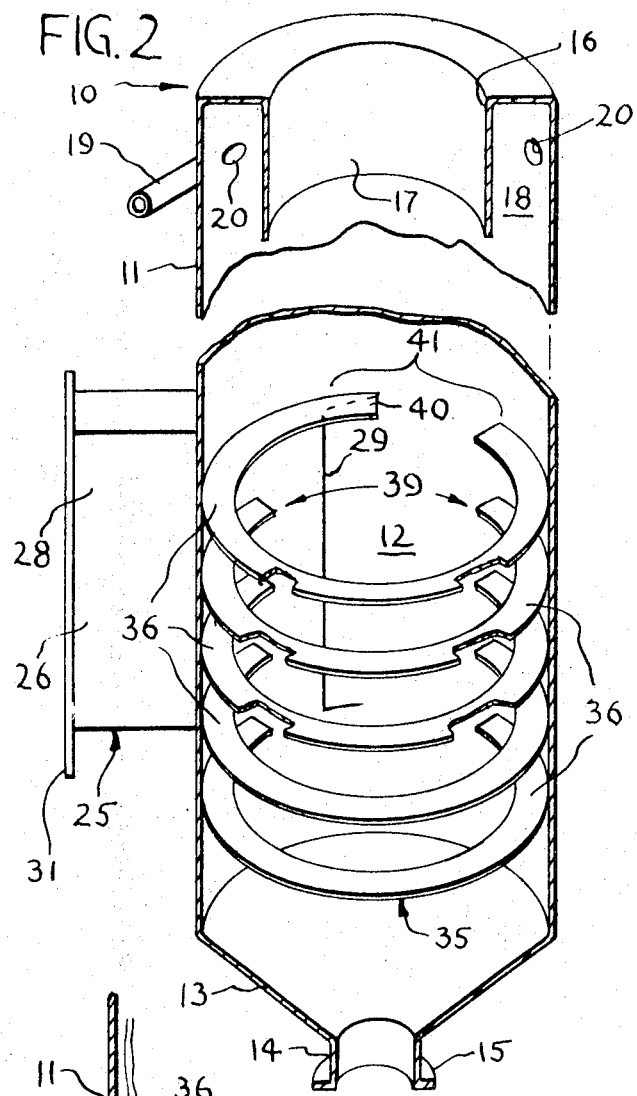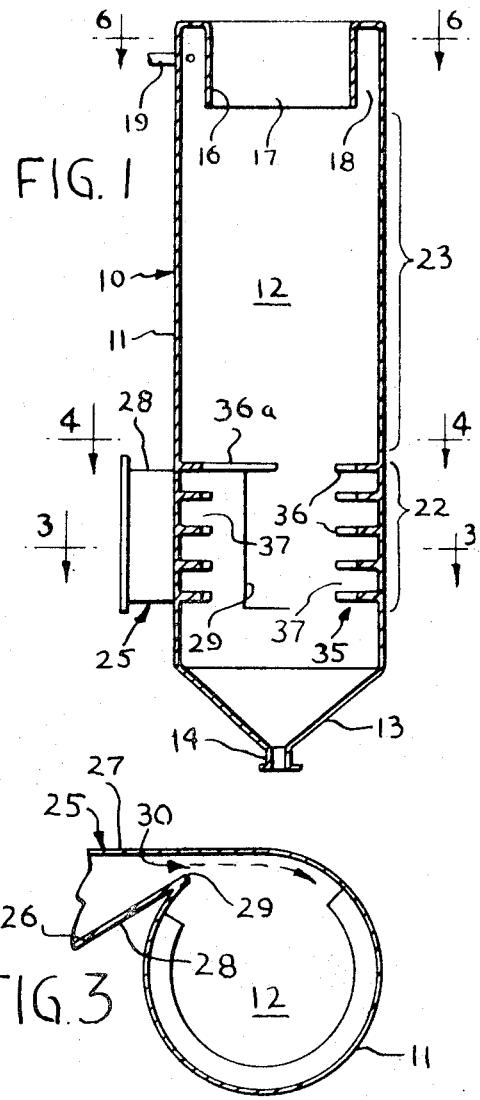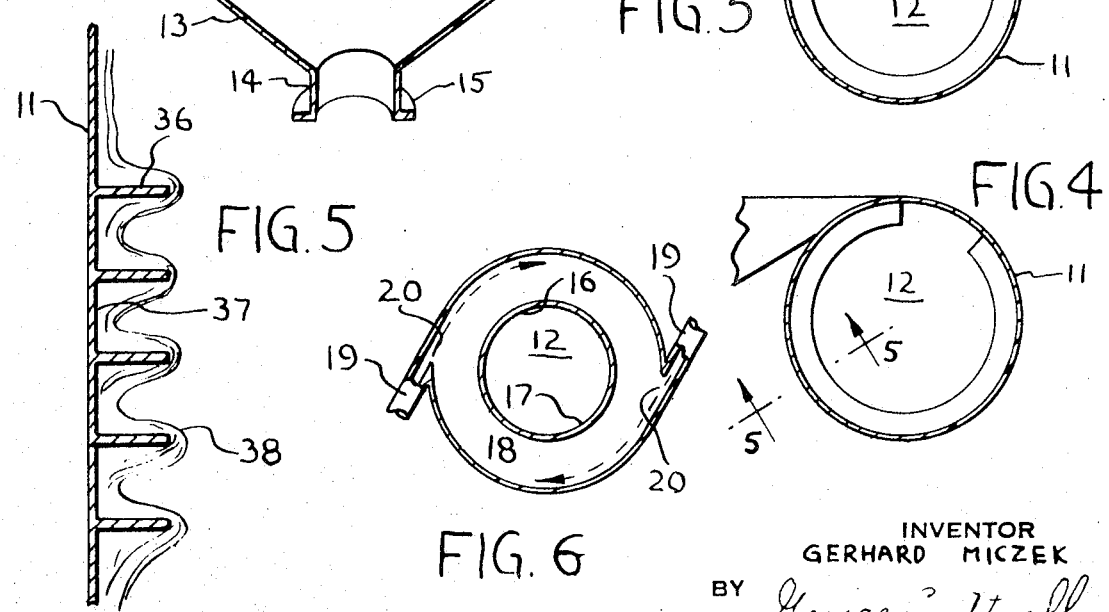

GAS SCRUBBING METHOD AND APPARATUS

BACKGROUND OF THE INVENTION

In response to the relatively recent acute interest in solving problems of atmospheric pollution, many different devices have been developed for removing particulate solids from industrial gases. Many of these devices utilize the concept of contacting the flowing gas with a flow of water whereby the solids are transferred from the gas to the water and drained out of the device. Highly efficient venturi-type devices have been developed that enable an impressive high percentage of removable of particles from a gaseous stream, but such devices are complicated and costly, involving complex designs, high capital investment, and high energy requirement.

There remains a pressing need for a high efficiency comparatively low cost and relatively simple industrial gas cleaning process and apparatus that involves the advantages and characteristics of more sophisticated equipment without the attendant complexity of design, initial high cost, and maintenance problems.

The present invention comprehends a highly improved yet relatively uncomplicated gas scrubbing process and apparatus wherein unusual efficiency is obtained by controlling the distance and direction of water flow at the point of initial contact between the gas flow and water flow. It is primary objective of this invention to enable the provision of the means for attaining this desired effect by low cost and unexpected modification of known structure to achieve an impressively improved and unexpected performance.

SUMMARY OF THE INVENTION

This invention relates generally to apparatus wherein contaminated gas is contacted with liquid whereby the contaminants are scrubbed from the gas so that the gas may be exhausted to the atmosphere as a substantially clean and relatively harmless effluent. More particularly, the invention relates to a medium energy centrifugal-type wet scrubber for cleaning dust from industrial gases, and the provision therewith of specific means for controlling the incoming gas flow and the water flow at a critical point in the apparatus whereby the efficiency of the scrubbing action is significantly enhanced.

The method taught by the present invention relates to significantly improving the efficiency of dust particle removal from the gas flow in a vertically-elongated cylindrical contacting chamber. More specifically, the method relates to the use of apparatus for contacting the gas flow with a liquid flow to remove dust particles from the gas flow in apparatus of the type having a vertically-extending cylindrical contacting chamber. The chamber has a liquid flow inlet means in the upper end thereof that is adapted to direct the liquid flow to wash down the entire inner surface of the chamber, and a liquid flow outlet means is provided in the lower end of the chamber to discharge dust-laden liquid therefrom. The upper end of the chamber also has a gas flow outlet means for exhausting cleaned gas flow therefrom. A tangentially-oriented gas inlet is disposed toward the lower end of the chamber and is adapted to provide a gas flow that traces an upwardly-spiralling pathway against the inner surface of the chamber whereby particles in the gas flow are centrifugally driven into the downwardly cascading water flow. In the type of apparatus heretofore described, the method of improving the efficiency of dust particle removal from the gas flow includes the steps of increasing the velocity of the gas flow as it enters the chamber, controlling the gas flow such that it follows a substantially horizontal pathway immediately upon entrance to the chamber, and increasing water flow accumulation particularly in the area of the horizontal pathway of the gas flow.

The described method may be implemented by apparatus, which, in its presently preferred form includes a vertically-elongated cylindrical casing defining a contacting chamber. A liquid flow inlet means is provided at the upper end of the chamber and is adapted to direct a liquid flow to wash down over the chamber's inner surface or cylindrical wall. The liquid flow is directed inwardly at the upper end of the chamber and preferably in a tangential orientation whereby it follows a helical path with an axis substantially coincidental to the axis of the chamber, as it washes down over the chamber wall. The lower end of the casing is provided with a funnel-like configuration for draining off the water from the chamber. A tangential gas flow inlet means is provided in the side wall of the chamber preferably adjacent the lower end of the chamber, for introducing a contaminated gas flow thereto. The gas flow spirals upwardly through the chamber and is exhausted through an upper end gas flow outlet means.

Means or structure for effecting or controlling both the gas flow and the liquid flow is located within the chamber inwardly adjacent the tangential gas flow inlet means, and is adapted to significantly increase the intermixing and total contact of the liquid flow with the gas flow in a manner which will be described in greater detail hereafter.

The structure of the flow effecting means preferably includes a plurality of vertically spaced-apart rigid ring-like members disposed to define annular channels therebetween. Each member is fastened to the chamber side wall in an annular arrangement whereby it protrudes radially inwardly a short distance toward the vertical axis of the chamber. The members are disposed such that they constitute vertically-successive annular ledges in the section of the chamber immediately adjacent the tangential gas inlet. The ledges thus formed serve to intersect the pathway of the liquid flow washing downwardly over the side wall of the chamber, with each member serving to extend the distance of travel of the water flow in the area of the gas inlet such that a comparatively greater water accumulation is thereby caused to occur in the primary contacting section of the chamber. The annular channels between adjacent ledges serve to guide the gas stream, upon its entrance to the chamber, in a horizontal circular pathway to assure thorough contact of the gas flow with a water curtain formed at the gas inlet opening. The interaction of the gas flow with the water curtain occasioned by the design and arrangement of the plurality of vertically spaced-apart ring-like members results in an unusual improvement in the rate of particle removal from the gas flow whereby an impressively cleaner effluent is exhausted into the atmosphere.

BRIEF DESCRIPTION OF THE DRAWING

While this specification concludes with claims particularly pointing out and distinctly claiming the subject matter which is regarded as the invention, it is believed that the invention will be better understood by reference to the accompanying drawing in which:

FIG. 1 is an elevational view in vertical section of apparatus for contacting a gas flow with a liquid flow in accordance with the present invention;

FIG. 2 is an enlarged fragmentary perspective view of the apparatus shown in FIG. 1, having a portion of the apparatus cut away to reveal internal components thereof;

FIG. 3 is a view in horizontal section taken along lines 3—3 of FIG. 1;

FIG. 4 is a view in horizontal section taken along lines 4—4 of FIG. 1;

FIG. 5 is a view in vertical section taken along lines 5—5 of FIG. 4; and

FIG. 6 is a view in vertical section taken along lines 6—6 of FIG. 1.

As shown in FIGS. 1 and 2, the structure of the present invention is preferably in the form of a collector device or apparatus 10 comprising a vertically elongated rigid casing 11 defining an internal contacting chamber 12. Liquid flow outlet means in the form of a funnel-like portion 13 is provided at the lower end of casing 11. The portion 13 is shown terminating in a discharge outlet 14 which may be provided with means such as an annular radially outwardly protruding flange 15 to facilitate a connection to a drain line (not shown). The upper end of the casing 11 is provided with means, preferably in the form of a substantially large central opening 16 defined by an annular collar portion 17, for exhausting cleaned gas from the chamber 12. The collar portion 17 preferably extends downwardly into the chamber 12 and is concentric to the longitudinal axis of the chamber. The diameter of the collar portion 17 is sufficiently less than the diameter of the upper portion of the casing 11 that an annular pocket area 18 is defined between the collar portion 17 and the circumjacent casing wall. The upper end of the casing 11 also has liquid flow inlet means, preferably in the form of one or more water inlet conduits 19 which deliver water from a pressurized water source (not shown). Each water inlet conduit 19 is sealably connected in flow communication with an opening 20 through the side wall of the casing 11.

In the preferred embodiment of the invention, each conduit 19 is oriented with respect to its opening 20 in a tangential relation (as shown in FIG. 6) to the circumference of the casing 11 whereby a flow of water injected into the upper end of the chamber 12 will follow a downward-progressing helical pathway against the inner surface of the chamber 12.

The chamber 12, as shown in FIG. 1, may be considered as comprising a lower end primary contacting section 22 and a secondary contacting section 23 being disposed directly above the primary contacting section 22. Contaminated gas, having particulate solids such as dust particles suspended therein, is delivered into the primary contacting section 22 by gas flow inlet means generally denoted in the drawing by numeral 25. The means 25 preferably comprises the gas delivery conduit 26 oriented generally laterally with respect to the primary contacting section 22. In its approach to the primary contacting section 22, the conduit 26 preferably has a rectangular internal cross section. In its connection to the casing 11, (see FIG. 3) an outer conduit side wall 27 of the conduit 26 is joined and merged uniformly into the side wall of the casing 11 while the opposite or inner conduit side wall 28 of the conduit 26 may follow a line tangential to the circumference of the casing 11. Although the exact configuration of the conduit 28 may be altered or modified, it is nevertheless important that the flow therefrom and into the primary contacting section 22 be in a tangential orientation as shown in FIG. 3.

The junction of the conduit 26 with the side wall of the casing 11 defines a substantially restricted opening 29 through which the contaminated gas flow is injected into the primary contacting section 22. It should be noted that the gas flow delivered into the primary contacting section 22 is required to pass through a merging or constricted throat area 30 whereby the velocity of the entering gas flow is substantially increased. It should be also noted that on the basis of the structure of the apparatus heretofore described, the high energy gas flow entering the primary contacting section 22 will spiral upwardly along the chamber's side wall in a pathway concentric to the chamber's longitudinal axis. With reference to the liquid flow, which progresses downwardly through chamber 12 by forming a spiralling sheet against the chamber's inner side wall surface, the gas flow follows a pathway that spirals upwardly through the secondary contacting section 23 such that the pathways of the gas flow and the liquid flow spiral concurrently even though they are progressing vertically away from each other.

The structure of the inlet means 25 may be a rigid integral portion of the casing 11, and an attaching means for a conduit from a source of contaminated gas, such as a flange 31, may be provided to enable rapid field installation of the apparatus.

Provision is made in the primary contacting section 22 of the chamber 12 for effecting or controlling both the water flow, as it progresses downwardly through the section 22, and the contaminated gas flow as it initially makes entrance into the section 22. The effecting means preferably takes the form of an assembly or structure 35 that includes at least a pair and preferably a plurality of annular rigid ring-like members 36 disposed in a vertically successive spaced-apart arrangement as such that at least one and preferably a plurality of horizontal annular flow channels 37 are defined thereby. Each member 36 is generally planar in cross section whereby it presents upwardly and downwardly facing opposite flat surfaces. The outer edge of each member 36 conforms to the inner side wall of the chamber 12 and is preferably welded into position thereon. The members 36 are arranged whereby, by their radially inward projection, they form a series of vertically successive ledges protruding in the pathway of the downwardly progressing water flow in the primary contacting section 22. The channels 37 constitute gas flow control passages that receive the gas flow from the opening 29 and initially hold it in a horizontal circular flow pattern so that it does not spiral immediately upwardly into the secondary contacting section 23. The combination of the constricted venturi-type opening 29 with the flow controlling means 35 therewith has proven to give measurable improved results in a wet collector or contacting apparatus of the general type disclosed.

The contacting and particle removing cycle of the apparatus begins when contaminated gas is introduced into the primary contacting section 22 of the chamber 12 through the gas inlet means 25. The configuration of the throat 30 at the opening 29 accelerates the gas flow whereby a high velocity flow impinges against the chamber side wall in the section 22 and follows an essentially horizontal circular flow pattern in the area of the rings 36. Clean scrubbing water is introduced in the upper end of the chamber 12 through the conduit 19 and associated openings 20. The water enters as a tangential flow in the pocket area 18 that follows the chamber surface. The water flow progresses continuously downwardly in a spiralling pattern that completely covers the internal surface of the secondary contacting chamber with a sheet or layer of moving water. In the primary contacting section 22 the water flow courses over and against the rings 36. This action is represented by numeral 38 in FIG. 5 of the drawing.

Inasmuch as the members 36 project inwardly toward the longitudinal axis of the chamber 12, they each serve as a ledge in the path of water flow, and the total distance of water flow through the primary contacting section 22 is effectively increased thereby. The arrangement of the members 36 influences the water flow to form a moving water curtain or film directly across the opening 29. The entering high energy gas flow must move against and through this water curtain and therefore the following effect occurs. The gas stream, which has been accelerated to a comparatively high velocity in the constricted throat 30, impacts with and passes through the dense water curtain whereby much of the water so impacted is atomized by the gas such that the particulate solids collide with and are trapped by literally millions of small water droplets which absorb the high kinetic energy of the particles. The gas stream is prevented from progressing immediately upwardly through the chamber 12 since its centrifugal force tends to push it outwardly into the channels 37. The gas stream decelerates in this area and then spirals centrally upwardly from the primary contacting section 22 where it continues to spirally progress upwardly and expand in the secondary contacting section 23. The gas stream continues to decelerate in the secondary contacting section 23, and air-entrained particle-carrying water droplets brought upwardly from the baffle area by the moving gas stream are driven into the circumjacent water sheet by centrifugal force. These particles are carried downwardly in the water flow and thus eliminated from the gas stream prior to its being exhausted from the apparatus. The water droplets forced into the water sheet as heretofore described are carried downwardly by the descending water sheet whereby collection and buildup of particulate solids on the chamber side wall are prevented.

In has been determined that the most beneficial effect from the construction shown within the primary contacting section 22 (FIGS. 1 and 2) can best be obtained by having the lowermost member 36 disposed close to, or coincidental with, the horizontal plane in which the lower edge of the opening 29 resides, and by having the uppermost member 36 disposed generally in the same proximity to the upper edge of the opening 29. The intermediate members 36 are then equidistantly spaced as shown between the uppermost and lowermost members 36.

It has further been determined that portions or sections 39 shown by dotted outline in FIG. 2, may be cut away and removed from the structure without substantially interfering with the effect that the structure has on the gas flow and water flow as heretofore described. These sections 39, if permitted to remain in place as shown on FIG. 2, will tend in time to be gradually eroded away by the high energy dust particles impacting thereagainst. The sections 39 can be removed and the desired water curtain, as heretofore described, can be maintained uniformly over the opening 29 in the vicinity generally beneath the area shown by bracket 41 in FIG. 2, if a portion 40 of the uppermost member 36 extends to overhang the opening 29 as shown in FIGS. 1, 2 and 4. Therefore, in the preferred embodiment of the invention, each member 36, although disposed in an annular orientation within the primary contacting section 12, may be cut short to a horseshoe-like configuration whereby the ends of the member terminate some distance away from the opening 29 as shown in FIG. 3. Then, there is no portion of any of the members 36 extending directly across the opening 29; however, the portion 40 of the uppermost member 36 overhangs the opening 29 and prevents incoming contaminated gas from escaping directly upwardly from the opening 29. The edge where the portion 40 terminates over the opening 29 serves to form an auxiliary water curtain substantially transverse to the major water curtain whereby it is further assured that no part of the incoming gas stream will miss the initial contacting action occasioned by the water curtain.

In the preferred embodiment of the invention, as shown particularly in FIGS. 1 and 2, it has also been found that in accordance with a predetermined constant gas flow volume being delivered through the conduit 26, the amount of water delivered particularly across the opening 29 can be effectively increased without an increase of the total water consumption in the apparatus if the width taken horizontally at the opening 29 is held to less than one-fifth of the vertical dimension of the opening.

Having heretofore described the construction and operation of the preferred embodiment of the present invention, it is believed worthwhile pointing out some particular differences between the apparatus described and collectors of the similar general configuration as utilized in the prior art. It has not been uncommon in the past to provide a water flow curtain that moves past an opening where a gas stream is brought into a contacting chamber; however, the efficiency of such a device is directly proportional to the amount of water that progresses through the contacting chamber. In other words, to increase the percentage of particle removal from a given gas volume in a prior art device, it is necessary to significantly increase the amount of water flowing through the contacting chamber while holding the gas flow stream relatively constant. Moreover, other prior art devices have sought to improve the interaction of the gas flow with a water flow by a provision of a means for agitating the water at the contact vicinity. One example of an attempt to do this includes the provision of a rotating drum situated centrally within the chamber whereby the water is agitated to form droplets to impact with and capture dust particles and carry them out at the device. In comparison to the prior art heretofore described, extensive experimentation with the structure of the present invention has proven that it will provide substantially increased efficiency of dust particle separation and collection without the extreme higher cost for either complex equipment or the need for an increase in the amount of water delivered through the apparatus.

The preceding written description and the various figures of the drawing pertain only to the presently preferred form of the invention. It is intended that the appended claims define the subject matter of the invention and it is specifically not intended that the invention be limited to the particular details of construction in the example presented. Therefore, although the invention has been described with a certain degree of particularity, it is understood that numerous changes or modifications in the details of the construction and the combination or arrangement of parts may be resorted to without departing from the spirit and scope of the invention as set forth in the appended claims.

I claim:

1. Apparatus for contacting a gas flow with a liquid flow to remove particulate solids from the gas flow, comprising:
   a. an elongated cylindrical contacting chamber disposed with its longitudinal axis extending vertically and having a primary contacting section and a secondary contacting section,
   b. the primary contacting section being located substantially adjacent the lower end of said chamber, with the secondary contacting section being the portion of said chamber above said primary contacting section,
   c. said secondary contracting section having a gas flow outlet means at its upper end for exhausting said gas flow therefrom,
   d. a liquid flow inlet means at the upper end of said secondary contacting section adapted to provide a liquid flow that washes downwardly through said chamber against the side wall thereof,
   e. a liquid flow outlet means below said primary contacting section for discharging said liquid flow from the chamber,
   f. gas flow inlet means disposed generally laterally to said primary contacting section for directing said gas flow thereto whereby said secondary contacting section receives said gas flow from said primary contacting section,
   g. means located in said primary contacting section for effecting said liquid flow moving therethrough and for effecting said gas flow immediately upon its entrance thereto,
   h. said effecting means including first and second rigid ring-like annular members disposed generally concentric to said chamber's longitudinal axis,
   i. each of said ring-like members being generally planar in cross section and having an outer peripheral edge fastened in firm abutment against said chamber side wall and being extended radially-inwardly toward said chamber's longitudinal axis such that each of said members forms a ledge that intersects the liquid flow moving downwardly over said side wall,
   j. said ring-like members being vertically spaced apart whereby, in conjunction with a portion of said chamber side wall therebetween, an annular flow channel is defined between said ring-like members, and
   k. said channel being disposed relative to said gas flow inlet means such that said gas flow entering said chamber flows initially in said channel.

2. The invention of claim 1 wherein said effecting means further includes a third rigid ring-like member disposed between and spaced apart from said first and second ring-like members such that a pair of said annular channels, one above the other, is defined by said ring-like members.

3. The invention of claim 1, wherein said gas flow inlet means is oriented to deliver said gas flow into said channel in a direction tangential to the circumference of said chamber such that said gas flow, while in said primary contacting section, maintains a horizontal and circular orientation, and thereafter follows a pathway that spirals upwardly through said secondary contacting section.

4. The invention of claim 1 further including means for increasing the velocity of said gas flow at a point preceding the initial contact of said gas flow with said liquid flow.

5. The invention of claim 1 wherein said liquid inlet means is adapted to inject said liquid flow into said chamber in a direction tangential to said chamber's circumference whereby said liquid flow follows a downwardly spiralling path against said chamber's side wall and circumjacent said chamber's longitudinal axis.

6. The invention of claim 1 wherein said gas flow inlet means is oriented to deliver said gas flow into said channel in a direction tangential to the circumference of said chamber such that said gas flow, while in said primary contacting section, maintains a horizontal and circular orientation and thereafter follows a pathway that spirals upwardly through said secondary contacting section, said liquid inlet means is adapted to deliver said liquid flow into said chamber in a direction tangential to said chamber's circumference whereby said liquid flow follows a downwardly spiralling pathway against said chamber's side wall and circumjacent said chamber's longitudinal axis, and said pathways of said gas flow and said liquid flow spiral concurrently relative to the longitudinal axis of said chamber while progressing vertically away from each other.

7. The invention of claim 1 wherein said gas flow outlet means comprises a substantially large opening in the upper end of said casing, an annular collar portion communicates with said large opening and extends downwardly into said secondary contacting section, the diameter of said casing being sufficiently greater than the diameter of said collar portion that an annular pocket area is defined between said collar and said casing, and said liquid flow inlet means is adapted to deliver said liquid flow initially into said pocket area whereby said liquid flow follows a circular and horizontal pathway in said pocket area before progressing downwardly through said secondary contacting section.

8. Apparatus as defined in claim 1 wherein said effecting means comprises a plurality of said ring-like members oriented to define a series of said channels in a vertically successive arrangement, said gas flow inlet means includes a vertically-elongated opening in the chamber's side wall, said opening has a substantially rectilinear configuration, and said ring-like members, in conjunction with the portions of said chamber's side wall defining said channels, have a combined exposed surface area such that the distance of travel of said downward liquid flow thereacross is at least one and one-half times the distance taken vertically between the upper and lower edges of said opening.

9. Apparatus as defined in claim 8 wherein the lateral dimension of said opening is less than one-fifth of said opening's longitudinal dimension.

10. The invention of claim 8 wherein each of said members has a portion cut away in the area of said opening whereby none of said members extends directly across said opening.

11. The invention of claim 10 wherein the uppermost of said ring-like members has a portion overhanging said opening.

12. Apparatus for contacting a gas flow with a liquid flow to remove dust particles from the gas flow, including:
   a. a vertically-extending cylindrical contacting chamber,
   b. a liquid flow inlet means in the upper end of said chamber adapted to direct said liquid flow to wash down the entire inner surface of said chamber,
   c. a liquid flow outlet means in the lower end of said chamber adapted to discharge dust-laden liquid therefrom,
   d. a gas flow outlet means in the upper end of said chamber for exhausting said gas flow therefrom after said dust particles have been substantially removed from said gas flow,
   e. a tangentially-oriented gas inlet disposed toward the lower end of said chamber and adapted to provide a gas flow that traces an upwardly-spiralling pathway against said inner surface of the chamber whereby particles in said gas flow are centrifugally driven into said liquid flow,
   f. flow controlling structure located within said chamber in a position horizontally adjacent said gas inlet, and being adapted to significantly effect both said liquid flow and said gas flow,
   g. said flow controlling structure defining at least a first horizontal annular flow chamber that receives said gas flow from said gas inlet, and
   h. said structure also being adapted to cause said liquid flow to form a water curtain across said gas inlet.

13. The invention of claim 12 wherein said flow control structure comprises a plurality of annular members disposed in a vertically-successive spaced-apart arrangement such that one or more horizontal annular flow channels are defined, at vertically-successive levels, by said annular members.

14. The invention of claim 12 wherein a section of each of said members, in the area adjacent said gas inlet, is removed such that none of said members extends across said gas inlet.

15. The invention of claim 14 wherein a portion of the uppermost of said members terminates above said gas inlet and is adapted to effect said liquid flow whereby a secondary liquid curtain is caused to form at an angle to said liquid curtain across said gas inlet.

16. A method of improving the efficiency of dust particle removal from a gas flow in an apparatus for contacting a gas flow with a liquid flow to remove dust particles from the gas flow of the type having a vertically-extending cylindrical contacting chamber with liquid flow inlet means on the upper end thereof and a liquid flow outlet means in the lower end thereof, gas flow outlet means in the upper end thereof, and a tagentially-oriented gas inlet for providing a gas flow into the lower end of the chamber that moves upwardly therethrough whereby dust particles are transferred from said gas flow to said liquid flow, said method comprising the steps of: increasing the velocity of said gas flow as it enters said chamber, temporarily confining said gas flow to a substantially horizontal pathway upon entrance to said chamber, and increasing liquid flow accumulation in the area of said horizontal pathway and across said gas inlet.

* * * * *